(12) United States Patent
Dionisio et al.

(10) Patent No.: US 12,495,933 B2
(45) Date of Patent: Dec. 16, 2025

(54) COFFEE GRINDING MACHINE CONFIGURED TO PROVIDE A DOSE OF STRATIFIED GROUND COFFEE AND ASSOCIATED METHOD

(71) Applicant: LA MARZOCCO S.R.L., Scarperia (IT)

(72) Inventors: Andrea Dionisio, Scarperia (IT);
Riccardo Gatti, Scarperia (IT);
Alessandro Parenti, Florence (IT);
Giulia Angeloni, Florence (IT);
Lorenzo Guerrini, Florence (IT)

(73) Assignee: LA MARZOCCO S.R.L., Scarperia (IT)

( * ) Notice: Subject to any disclaimer, the term of this patent is extended or adjusted under 35 U.S.C. 154(b) by 805 days.

(21) Appl. No.: 17/421,548

(22) PCT Filed: Jan. 14, 2020

(86) PCT No.: PCT/EP2020/050773
§ 371 (c)(1),
(2) Date: Jul. 8, 2021

(87) PCT Pub. No.: WO2020/148258
PCT Pub. Date: Jul. 23, 2020

(65) Prior Publication Data
US 2022/0095839 A1      Mar. 31, 2022

(30) Foreign Application Priority Data
Jan. 15, 2019   (IT) .................. 102019000000591

(51) Int. Cl.
*A47J 42/18*      (2006.01)
*A47J 42/46*      (2006.01)

(52) U.S. Cl.
CPC ............... *A47J 42/18* (2013.01); *A47J 42/46* (2013.01)

(58) Field of Classification Search
None
See application file for complete search history.

(56) References Cited

U.S. PATENT DOCUMENTS

| 4,967,648 | A | 11/1990 | Helbling |
| 5,133,983 | A | 7/1992 | Greiwe |
| (Continued) | | | |

FOREIGN PATENT DOCUMENTS

| AU | 2015100960 | 9/2015 |
| CA | 2962617 A1 | 4/2016 |
| (Continued) | | |

OTHER PUBLICATIONS

U.S. Appl. No. 17/289,093, filed Apr. 27, 2021, entitled "Espresso Coffee Machine With Adjustment of the Dispensing Pressure and Method for Adjusting the Dispensing Pressure of an Espresso Coffee Machine".

(Continued)

*Primary Examiner* — Elizabeth M Kerr
(74) *Attorney, Agent, or Firm* — NIXON & VANDERHYE P.C.

(57) ABSTRACT

There is disclosed a coffee grinding machine for grinding coffee beans and forming a dose of ground coffee directly in a filter basket with a bottom layer of ground coffee having a first mean particle size and an adjacent layer of ground coffee having a second mean particle size, comprising: grinding members for grinding coffee beans, an electric motor for causing rotation of at least one grinding member with respect to another grinding member, and a device configured to cause, during grinding of coffee beans for forming dose, a variation of rotation speed of said electric (Continued)

motor between a first speed and a second speed, wherein either said second mean particle size is smaller than said first mean particle size and said first speed is greater than said second speed or said second mean particle size is greater than said first mean particle size and said first speed is lower than said second speed.

15 Claims, 5 Drawing Sheets

(56) References Cited

U.S. PATENT DOCUMENTS

| | | | |
|---|---|---|---|
| 5,239,519 | A | 8/1993 | Nelson |
| 5,259,297 | A | 11/1993 | Guiliano |
| 5,372,061 | A | 12/1994 | Albert |
| 5,462,236 | A | 10/1995 | Knepler |
| 5,555,791 | A | 9/1996 | McNeill et al. |
| 5,870,943 | A | 2/1999 | Levi |
| 6,058,986 | A | 5/2000 | Bethuy |
| 6,067,894 | A | 5/2000 | Eugster |
| 6,085,637 | A | 7/2000 | Fukushima |
| 6,155,158 | A | 12/2000 | Anson |
| 6,164,189 | A | 12/2000 | Anson |
| 6,459,854 | B1 | 10/2002 | Yoakim et al. |
| 6,550,370 | B2 | 4/2003 | Dam |
| 6,611,660 | B1 | 8/2003 | Sagal |
| 7,461,585 | B2 | 12/2008 | Nenov |
| 8,215,229 | B2 | 7/2012 | Faccinti |
| 8,272,319 | B2 | 9/2012 | Jarisch |
| 8,663,724 | B1 | 3/2014 | Banasik |
| 8,696,899 | B2 | 4/2014 | Roulin |
| 8,850,956 | B2 | 10/2014 | Bianchi et al. |
| 8,850,959 | B2 | 10/2014 | Banchi et al. |
| 8,857,318 | B2 | 10/2014 | Zhong |
| 8,895,095 | B2 | 11/2014 | Star et al. |
| 9,125,519 | B2 | 9/2015 | Goeltenboth et al. |
| 9,578,986 | B2 | 2/2017 | Ceotto et al. |
| 9,986,870 | B2 | 6/2018 | Reyhanloo |
| 10,602,874 | B2 | 3/2020 | Cable |
| 10,687,660 | B2 | 6/2020 | Gatti et al. |
| 10,881,242 | B2 | 1/2021 | Dionisio et al. |
| 11,103,104 | B2 | 8/2021 | Bakke et al. |
| 11,122,927 | B2 | 9/2021 | Bianchi et al. |
| 2004/0079237 | A1 | 4/2004 | Denisart |
| 2004/0244599 | A1 | 12/2004 | Wei |
| 2005/0011364 | A1 | 1/2005 | Chen et al. |
| 2006/0037481 | A1 | 2/2006 | Bicht |
| 2006/0150821 | A1 | 7/2006 | Paul |
| 2006/0278093 | A1 | 12/2006 | Biderman et al. |
| 2006/0283329 | A1 | 12/2006 | Ronci |
| 2007/0051247 | A1 | 3/2007 | Felty |
| 2007/0193452 | A1 | 8/2007 | Campetella et al. |
| 2007/0227363 | A1 | 10/2007 | Verna |
| 2007/0277676 | A1 | 12/2007 | Crivellin |
| 2008/0190297 | A1 | 8/2008 | Gussmann |
| 2009/0095165 | A1 | 4/2009 | Nosler |
| 2009/0114099 | A1 | 5/2009 | Gotlenboth |
| 2009/0205502 | A1 | 8/2009 | Carbonini |
| 2010/0003022 | A1 | 1/2010 | Rehanloo |
| 2010/0005971 | A1 | 1/2010 | Faccinti |
| 2010/0018407 | A1 | 1/2010 | Liu |
| 2010/0112165 | A1 | 5/2010 | Masciandaro et al. |
| 2010/0229728 | A1 | 9/2010 | Kiefer et al. |
| 2010/0233337 | A1 | 9/2010 | Aigner |
| 2010/0263543 | A1 | 10/2010 | Krauchi |
| 2010/0282090 | A1 | 11/2010 | Etter |
| 2010/0300299 | A1 | 12/2010 | Epars et al. |
| 2011/0005398 | A1 | 1/2011 | Garcia |
| 2011/0042408 | A1 | 2/2011 | Giordano |
| 2011/0048243 | A1 | 3/2011 | Bambi |
| 2011/0117259 | A1 | 5/2011 | Storek |
| 2012/0017767 | A1 | 1/2012 | Samso Besora |
| 2012/0090474 | A1 | 4/2012 | Carbonini |
| 2012/0118164 | A1 | 5/2012 | Tonelli et al. |
| 2012/0121780 | A1 | 5/2012 | Lai et al. |
| 2012/0171332 | A1 | 7/2012 | Lai |
| 2012/0222666 | A1 | 9/2012 | Morgandi |
| 2013/0098249 | A1 | 4/2013 | Fidler et al. |
| 2013/0330453 | A1 | 12/2013 | Majer |
| 2014/0123857 | A1 * | 5/2014 | Rego ................. A47J 31/42 99/280 |
| 2014/0137746 | A1 | 5/2014 | Moran et al. |
| 2014/0314921 | A1 | 10/2014 | Kuempel et al. |
| 2014/0352543 | A1 | 12/2014 | Boni |
| 2016/0220067 | A1 | 8/2016 | Teahan |
| 2016/0249763 | A1 | 9/2016 | Llopis |
| 2017/0119195 | A1 | 5/2017 | Al-Sahibani |
| 2018/0055275 | A1 | 3/2018 | Bianchi |
| 2018/0271319 | A1 | 9/2018 | Gatti et al. |
| 2018/0279831 | A1 * | 10/2018 | Ottavi ................. A47J 42/44 |
| 2018/0303284 | A1 | 10/2018 | Gatti et al. |
| 2018/0360257 | A1 | 12/2018 | Dionisio et al. |
| 2019/0008325 | A1 * | 1/2019 | Huerta-Ochoa ...... A47J 43/082 |
| 2019/0075964 | A1 | 3/2019 | Della Pietra et al. |
| 2019/0274470 | A1 | 9/2019 | Curtis |
| 2020/0093323 | A1 | 3/2020 | Dionisio et al. |
| 2020/0237137 | A1 | 7/2020 | Bakke et al. |
| 2021/0204748 | A1 | 7/2021 | Della Pietra et al. |
| 2022/0117442 | A1 | 4/2022 | Dionisio |

FOREIGN PATENT DOCUMENTS

| | | | |
|---|---|---|---|
| CN | 1424886 A | 6/2003 | |
| CN | 101229019 A | 7/2008 | |
| CN | 101600377 A | 12/2009 | |
| CN | 100588354 C | 2/2010 | |
| CN | 201401779 Y | 2/2010 | |
| CN | 202179442 U | 4/2012 | |
| CN | 102595984 A | 7/2012 | |
| CN | 102761565 | 10/2012 | |
| CN | 103118574 A | 5/2013 | |
| CN | 203 122 128 | 8/2013 | |
| CN | 103391734 A | 11/2013 | |
| CN | 104080379 A | 10/2014 | |
| CN | 104619218 A | 5/2015 | |
| CN | 105640339 A | 6/2016 | |
| CN | 106073509 A | 11/2016 | |
| CN | 107692874 | 2/2018 | |
| DE | 29 19 110 | 11/1980 | |
| DE | 3503011 | 7/1986 | |
| DE | 10 2011 116 913 A1 | 9/2012 | |
| DE | 10 2013 107077 | 1/2015 | |
| EP | 0 838 185 | 4/1998 | |
| EP | 1 034 729 | 9/2000 | |
| EP | 1 688 072 B1 | 8/2006 | |
| EP | 1 747 736 | 1/2007 | |
| EP | 1 886 604 A1 | 2/2008 | |
| EP | 2 218 374 A2 | 8/2010 | |
| EP | 2 314 182 | 4/2011 | |
| EP | 2 316 796 | 5/2011 | |
| EP | 2 490 580 | 8/2012 | |
| EP | 2 490 578 | 9/2013 | |
| EP | 2 644 066 | 10/2013 | |
| EP | 2 701 563 | 3/2014 | |
| EP | 2 789 276 | 10/2014 | |
| EP | 2 810 592 | 12/2014 | |
| EP | 3 042 591 | 7/2016 | |
| EP | 3 064 099 | 9/2016 | |
| EP | 3087844 A2 * | 11/2016 | ............... A23F 5/08 |
| EP | 3 167 782 | 5/2017 | |
| EP | 3 225 141 | 10/2017 | |
| EP | 3 329 815 | 6/2018 | |
| FR | 1 174 038 | 3/1959 | |
| FR | 1 449 310 | 8/1966 | |
| FR | 2 901 681 | 12/2007 | |
| GB | 726 272 | 3/1955 | |
| GB | 728 476 | 4/1955 | |
| JP | 2004-534562 A | 11/2004 | |
| JP | 2005-040605 A | 2/2005 | |
| JP | 2009-537260 A | 10/2009 | |
| JP | 2012-035040 A | 2/2012 | |
| JP | 2014-506820 A | 3/2014 | |
| JP | 2015-518381 A | 7/2015 | |

(56) References Cited

FOREIGN PATENT DOCUMENTS

| | | | |
|---|---|---|---|
| JP | 2015-144714 A | 8/2015 | |
| RU | 2 160 035 C2 | 12/2000 | |
| WO | WO 2006/082064 | 8/2006 | |
| WO | 1 898 758 B1 | 11/2006 | |
| WO | WO 2008/114210 | 9/2008 | |
| WO | WO 2009/010190 | 1/2009 | |
| WO | WO-2009068921 A1 * | 6/2009 | ............... B02C 4/06 |
| WO | WO 2010/113116 | 10/2010 | |
| WO | WO 2011/055189 | 5/2011 | |
| WO | WO 2011/095926 | 8/2011 | |
| WO | WO 2011/140582 | 11/2011 | |
| WO | WO 2012/138327 A1 | 10/2012 | |
| WO | WO 2012/146641 A1 | 11/2012 | |
| WO | WO 2013/112732 | 8/2013 | |
| WO | WO 2013/121438 | 8/2013 | |
| WO | W0 2014/187110 A1 | 11/2014 | |
| WO | WO 2014/177925 | 11/2014 | |
| WO | WO 2014/207281 | 12/2014 | |
| WO | WO 2015/006244 A1 | 1/2015 | |
| WO | WO 2015/055342 A1 | 4/2015 | |
| WO | WO 2015/055557 | 4/2015 | |
| WO | WO 2016/057568 | 4/2016 | |
| WO | WO 2016/093920 | 6/2016 | |
| WO | WO 2016/124573 | 8/2016 | |
| WO | WO 2017/009186 | 1/2017 | |
| WO | WO 2017/009189 | 1/2017 | |
| WO | 2017/055433 | 4/2017 | |
| WO | WO 2017/068021 | 4/2017 | |
| WO | WO 2018/115876 | 6/2018 | |
| WO | WO 2018/219878 | 12/2018 | |

OTHER PUBLICATIONS

U.S. Appl. No. 17/286,133, filed Apr. 16, 2021, entitled "Active System for Monitoring and Filtering the Water for an Espresso Coffee Machine and Associated Espresso Coffee Machine".
U.S. Appl. No. 17/422,904, filed Jul. 14, 2021, entitled "Ultrasonic Cleaner Device for an Espresso Coffee Machine and Espresso Coffee Machine Incorporating Such a Cleaner Device".
U.S. Appl. No. 17/428,128, filed Aug. 3, 2021, entitled "Coffee Grinding Machine With Improved Dosing System and Associated Method".
U.S. Appl. No. 17/428,181, filed Aug. 3, 2021, entitled "Coffee Grinding Machine Configured to Provide Different Particle Size Profiles and Associated Method".
International Search Report for PCT/EP2016/066181, mailed Oct. 5, 2016, 3 pages.
International Search Report for PCT/EP2016/074726, mailed Jan. 31, 2017, 2 pages.
International Search Report for PCT/EP2016/075182 mailed Feb. 23, 2017, 4 pages.
Written Opinion of the ISA for PCT/EP2016/075182 mailed Feb. 23, 2017, 5 pages.
English Translation for CN 102761565 published Oct. 2012.
English translation of JP Office Action mailed Jun. 8, 2021 in JP application 2018-517145.
International Search Report for PCT/EP2016/066186, mailed Aug. 12, 2016, 3 pages.
Office Action mailed Dec. 10, 2019 in U.S. Appl. No. 15/739,856.
International Search Report for PCT/EP2017/052213, mailed May 4, 2017, 3 pages.
International Search Report and Written Opinion mailed Jun. 9, 2016, issued in PCT/EP2016/053894.
International Search Report for PCT/IB2018/051865, mailed Jul. 2, 2018, 3 pages.
Opinion of the ISA for PCT/IB2018/051865, mailed Jul. 2, 2018, 5 pages.
Chinese Office Action and English translation mailed Mar. 31, 2021 in Chinese Application 201880018668.5.
Yingile et al, "Optimal Tuning of Temperature Control Parameters for Post-Mixed Beverage Machines Based on Changes in Thermal Load", Computer Technology and Automation, vol. 30, Issue 1, Mar. 15, 2011, pp. 33-38.
International Search Report for PCT/EP2019/079672 mailed Dec. 18, 2019, 3 pages.
Written Opinion of the ISA for PCT/EP2019/079672 mailed Dec. 18, 2019, 5 pages.
Blake, B., and S. Callendar, "Barista Tips and Techniques: Brew Ratios Around the World," Oct. 24, 2014, Newsletter, La Marzocco, Seattle, Wash., <https://home.lamarzoccousa.com/brew-ratios-around-world/> [retrieved Jun. 3, 2015], 10 pages.
International Search Report and Written Opinion mailed Jun. 15, 2015, issued in corresponding International Application PCT/IB2015/051903, filed Mar. 16, 2015, 10 pages.
Paul, "Weighing Espresso—How It Works," Nov. 16, 2010, Blog, Marco Beverage Systems U.S., Seattle, Wash., <http://rnarcobeveragesystems.com/us/weighing-espresso-how-it-works/> [retrieved Jun. 3, 2015], 1 page.
International Search Report for PCT/IB2019/054750, mailed Aug. 13, 2019, 4 pages.
Written Opinion of the ISA for PCT/IB/2019/057750, mailed Aug. 13, 2019, 5 pages.
International Search Report for PCT/EP2020/051464, mailed Apr. 21, 2020, 4 pages.
Written Opinion of the ISA for PCT/EP2020/051464, mailed Apr. 21, 2020, 6 pages.
International Search Report for PCT/EP2019/080559, mailed Feb. 11, 2020, 5 pages.
Written Opinion of the ISA for PCT/EP2019/080559, mailed Feb. 11, 2020, 5 pages.
International Search Report for PCT/IB2020/050905 mailed Aug. 4, 2020, 3 pages.
Written Opinion of the ISA for PCT/IB2020/050905 mailed Aug. 4, 2020, 5 pages.
International Search Report for PCT/IB2020/050907 dated Apr. 6, 2020, 4 pages.
Written Opinion of the ISA for PCT/IB2020/050907 dated Apr. 6, 2020, 6 pages.
International Search Report for PCT/EP2020/050773 dated Apr. 20, 2020, 4 pages.
Written Opinion of the ISA for PCT/EP2020/050773 dated Apr. 20, 2020, 5 pages.
U.S. Office Action dated Sep. 27, 2024 issued in U.S. Appl. No. 17/428,181, 33 pp.

* cited by examiner

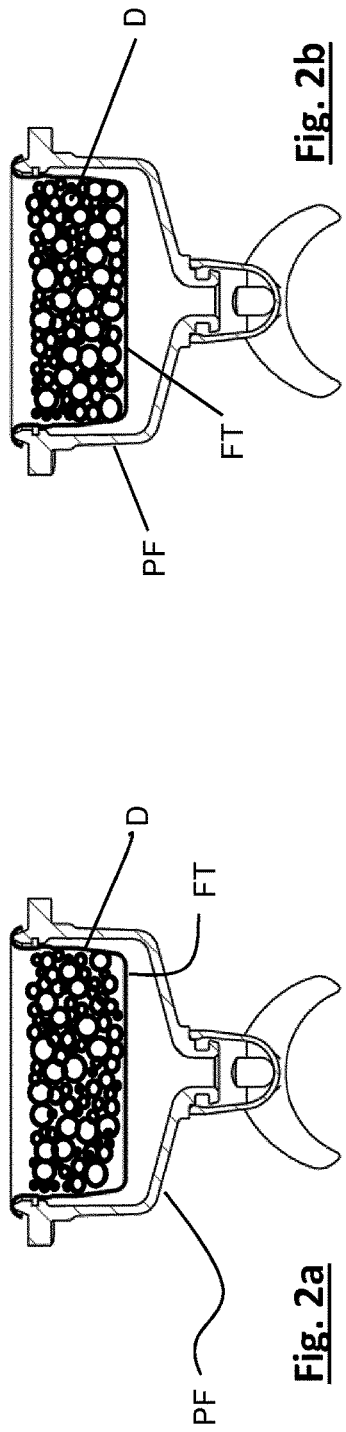
Fig. 2a
Fig. 2b
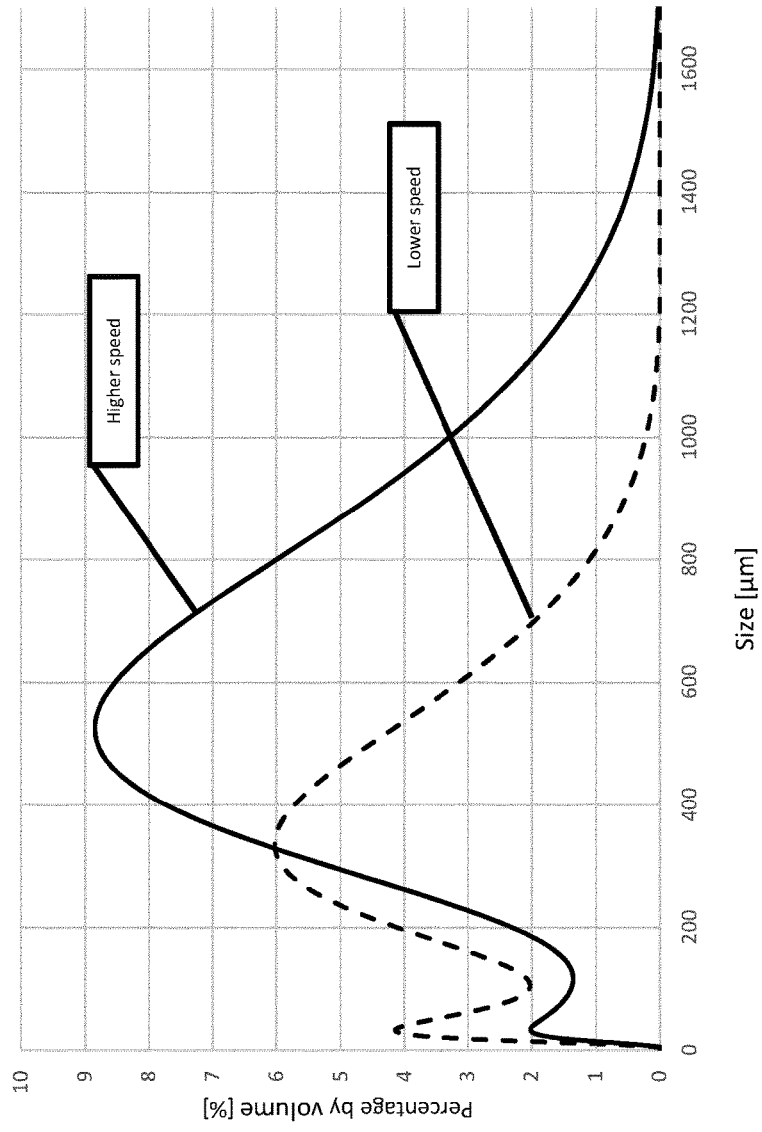
Fig. 3

COFFEE GRINDING MACHINE CONFIGURED TO PROVIDE A DOSE OF STRATIFIED GROUND COFFEE AND ASSOCIATED METHOD

This application is the U.S. national phase of International Application No. PCT/EP2020/050773 filed Jan. 14, 2020 which designated the U.S. and claims priority to IT Patent Application No. 102019000000591 filed Jan. 15, 2019, the entire contents of each of which are hereby incorporated by reference.

BACKGROUND

The present invention relates to a machine for grinding coffee beans. The machine for grinding coffee beans may be a separate machine or may be incorporated in a machine for the production of coffee-based beverages. Such a machine is also known simply as a "coffee grinding machine", "coffee grinder" or "mill". More particularly, the present invention relates to a coffee grinding machine configured to provide a dose of suitably stratified ground coffee.

BACKGROUND ART

As is known, for the preparation of an espresso coffee, a certain quantity of ground coffee, usually referred to as "dose", is used. A dose may be a single, double or multiple dose. The dose of ground coffee is loaded into a filter basket, typically in the form of a cup which is open at the top and which has a bottom with micro-perforations. Typically the dose of coffee is pressed inside the filter basket to form a puck of coffee powder. The filter is in turn supported by a portafilter configured to engage removably inside a dispensing unit of an espresso coffee machine. The espresso coffee is obtained by passing hot water under pressure through the puck of coffee powder.

The coffee powder is obtained with a coffee grinding machine. In a known coffee grinding machine the coffee beans are ground by causing them to pass through grinding members. Grinding members of the flat, conical or cylindrical type are known. Typically, the grinding members of a coffee grinding machine comprise a stationary member and a member rotating relative to the stationary member. For example, in a coffee grinder with conical grinders, one grinder is immobile and stationary, while the other grinder is rotated by a motor. Some coffee grinding machines are able to modify the distance between the grinders in order to vary the particle size of the coffee powder.

US 2016/220067 A1 discloses a variable speed coffee grinder.

EP 2 810 592 A1 discloses a coffee-mill in particular for an automatic coffee machine.

WO 2017/055 433 A1 discloses a coffee grinder with variable speed.

DE 35 03 011 A1 discloses a device for setting the grinding body spacing of a grain mill.

CN 107 692 874 A discloses a grinding device rotational speed adjusting speed.

SUMMARY OF THE INVENTION

The Applicant has carried out experiments in connection with ground coffee powder. For the purposes of the present invention, the ground coffee powder is considered to be formed substantially by particles or granules which have a theoretical characteristic size. This theoretical characteristic size will also be referred to below in the present description by the term "equivalent diameter". Furthermore, the abbreviated term "ground product" may be used as an alternative to the more complete term "ground coffee powder" or other similar expressions.

The Applicant has realized that all the known coffee grinding machines, whoever the manufacturer or whatever the type of grinding member or the particular mechanism used, produce a ground product comprising granules which vary greatly in size from each other. The range of equivalent diameters covers three orders of magnitude, from a few microns to more than one millimetre.

The relatively large number of granules may be expressed as a particular profile called a "particle size profile" or "particle size curve" which has a progression (irrespective of the coffee grinding machine used) similar to that shown in FIG. 1.

The curve which shows the particle size profile is called a bimodal profile. The high peak (on the right) is called "first modal", while the low peak (on the left) is called "second modal".

As mentioned briefly above, the purpose of the ground coffee is that of being used in an espresso coffee machine for dispensing coffee beverages.

As is obvious, particle sizes where there is a greater number of fine particles result in a smaller water flow and therefore in coffee which is "shorter" during the same dispensing time compared to particle sizes where there is a greater number of large particles.

Typically, each bartender suitably adjusts his/her coffee grinding machine so as to obtain a particle size which, in his/her opinion, produces an optimum beverage.

Whether the machine has flat grinders, conical grinders or cylindrical grinders, the smaller the distance between the grinding members, the greater will be the number of fine particles and the smaller the number of large particles. The greater the distance between the grinding members, the opposite will be true (i.e. a smaller number of fine particles and a greater number of large particles).

Usually a bartender adjusts the grinding setting whenever there is a change of coffee beans loaded into hopper before grinding. The change of coffee may be due to the use of a different brand or a different packet of the same brand.

The object defined by the Applicant is that of reducing the sensitivity of a coffee grinding machine to the variations in coffee to be ground.

Another object defined by the Applicant is that of providing a coffee grinding machine able to vary suitable the organoleptic characteristics of the espresso coffee obtained via the ground product.

According to the Applicant, the aforementioned objects are achieved by means of a coffee grinding machine which is able to modify the particle size curve during the grinding of a dose of coffee.

US 2016/220067 A1 remarks at [0019] that a coffee grinder with a variable speed motor can grind finely ground coffee more precisely and consistently at lower speeds than conventional high-speed grinders. Different methods of brewing coffee such as espresso coffee require that coffee beans be cut into consistent particles of even distribution. Existing coffee grinders spinning at high rates of speed tend to crush the coffee beans rather than cut them, especially when the motor starts resulting in an inconsistent particle size.

US 2016/220067 A1 discloses a coffee grinder that uses a variable speed motor whose speed and starting torque characteristics can be adjusted via a programmable controller to accommodate a variety of coffee preparation methods or coffee bean types while retaining the ability to grind at high speeds when precision is unnecessary.

Contrarily to said teachings, the present invention aims to provide a ground coffee dose directly in the filter basket with different layers having different mean size.

According to a first aspect there is provided a coffee grinding machine for grinding coffee beans and forming a dose of ground coffee in a filter basket with a bottom layer of ground coffee having a first mean particle size and an adjacent layer of ground coffee having a second mean particle size, comprising:

grinding members for grinding coffee beans,
an electric motor for causing rotation of at least one grinding member with respect to another grinding member, and
a device configured to cause, during grinding of coffee beans for forming dose, a variation of rotation speed of said electric motor between a first speed and a second speed,
wherein either
said second mean particle size is smaller than said first mean particle size and said first speed is greater than said second speed or
said second mean particle size is greater than said first mean particle size and said first speed is lower than said second speed.

The adjacent layer is a layer which is adjacent to the first layer and on the top thereof. The first layer is generated first (so that the ground coffee rests substantially on the bottom of the filter basket) and the adjacent layer is generated immediately after the first one so that the corresponding ground coffee rests on the first layer. One or more layers can be provided on the adjacent layer, with said one or more layers having ground coffee grains with different mean size with respect to the mean size of the ground coffee in said adjacent layer.

According to embodiments, the coffee grinding machine further comprises a rev counter for counting the number of revolutions of the grinding member with respect to the other grinding member, wherein said speed variation device is configured to vary the speed from the first speed to the second speed depending on a set number of relative revolutions of said grinding member and said other grinding member.

The set number of relative revolutions can be any number, either integer or decimal. Preferably, the set number of relative revolutions is calculated as a function of the total set time for grinding a dose or as a function of the total number of revolutions for grinding a dose. Additionally, preferably, the set number of relative revolutions is calculated as a function of the total number of layers in the dose.

It should be noticed that the first speed is the speed reached by the motor after a threshold number of revolutions, calculated from the start-up of the motor. Such a number of revolutions can be set as any number between about 0.5 and about 3.0 (for instance about 0.5, 1.0, 1.5, 2.0, 2.5 and 3.0).

For instance, if the threshold number of revolutions is set to 1.0, the total number of revolutions is set to 5 and the total number of layers is 2, the set number of relative revolutions can be 2. In other words, during the first revolution the first speed is reached, such a first speed is maintained for two revolutions and then the second speed is maintained for the remaining two revolutions. However, the grinding can also be set so that the number of revolutions for the first layer is different from the number of revolutions of the first layer. More than two layers can be provided.

According to embodiments, the coffee grinding machine further comprises a timer, wherein said speed variation device is configured to vary the speed from the first speed to the second speed depending on a set time period calculated from start-up of the electric motor.

The set time period can be calculated as a function of the total set time for grinding a dose. Additionally, preferably, the set time period can be calculated as a function of the total number of layers in the dose.

A threshold time is preferably considered. Such threshold time is the time from start-up of the motor to the reaching of first speed. Such threshold time can be a fraction of the total time for grinding a dose.

According to embodiments, the threshold time can be between about 1/7 and about 1/4 of the total time for grinding a dose. For instance, the threshold time can be between about 1/6 and about 1/5 of the total time for grinding a dose. If the total time is about 6 seconds, the threshold time can be between about 1 sec. and about 1.2 sec.

For instance, if the total time is 6 seconds, the threshold time is 1 sec. and the total number of layers is 2, the variation from the first to the second speed can take place after 3.5 sec. from starting of the motor.

According to embodiments, the coffee grinding machine further comprises a weighing member for calculating the mass of the dose of ground coffee, wherein said speed variation device is configured to vary the speed from the first speed to the second speed depending on a mass of a first portion of a coffee dose which was ground at said first speed.

Also in this case, preferably a threshold is taken into account and the mass of a coffee dose is calculated after a threshold time or a threshold number of revolutions. The threshold time can be a fraction of the total time for grinding a dose as said above. The threshold number of revolutions can be a fraction of the total number of revolutions for grinding a dose as said above.

The speed variation device can be configured to vary the speed of the electric motor stepwise or continuously.

According to embodiments, the coffee grinding machine further comprises an interface for selecting a speed profile for grinding a dose of coffee.

According to embodiments, the coffee grinding machine further comprises an encoder for detecting the rotation speed of the electric motor.

According to a second aspect, the present invention provides a method of grinding coffee beans to obtain a dose of ground coffee in a filter basket with a bottom layer of ground coffee having a first mean particle size and an adjacent layer of ground coffee having a second mean particle size, the method comprising:

(a) providing grinding members for grinding coffee beans,
(b) providing an electric motor for causing rotation of one grinding member with respect to another grinding member, and
(c) during grinding, rotating said at least one grinding member with respect to the other grinding member at a first speed and then at a second speed,
wherein either
said second mean particle size is smaller than said first mean particle size and said first speed is greater than said second speed or
said second mean particle size is greater than said first mean particle size and said first speed is lower than said second speed.

According to embodiments, the present invention further comprises counting the number of revolutions of the grinding member with respect to the other grinding member and varying the speed from the first speed to the second speed depending on a set number of relative revolutions of said grinding member and said other grinding member.

According to embodiments, the present invention further comprises varying the speed from the first speed to the second speed depending on a set time period calculated from start-up of the electric motor.

According to embodiments, the present invention further comprises varying the speed from the first speed to the second speed depending on a mass of a first portion of a coffee dose which was ground at said first speed.

Said variation of the speed from the first start-up speed to the second speed can be performed continuously or stepwise.

According to embodiments, instead of the device configured to cause, during grinding of coffee beans for forming dose, a variation of rotation speed of said electric motor between a first speed and a second speed, there could be provided an actuator configured to cause a variation of a distance between one grinding member and another grinding member during grinding of the coffee beans to obtain the dose of ground coffee.

The actuator may be configured to vary the distance between the grinders continuously or stepwise during grinding of the coffee beans to obtain the dose of ground coffee.

The distance between the grinders may be varied from a first distance to at least a second distance during grinding of a dose, wherein said first distance is smaller than said second distance so as to obtain at least a first portion of a dose of ground coffee having a first particle size and a second portion of a dose of ground coffee having a second particle size.

Advantageously, the coffee grinding machine may also comprise an interface for selecting a speed profile or a distance profile for grinding a dose of coffee.

Advantageously, the coffee grinding machine may also comprise an encoder for detecting the rotation speed of the electric motor.

According to another aspect, instead of varying the rotation speed of the electric motor during grinding of the coffee beans to obtain the dose of ground coffee, a distance is varied between the grinding members during grinding of the coffee beans to obtain the dose of ground coffee.

The distance between the grinders may be varied continuously or stepwise during grinding of the coffee beans to obtain the dose of ground coffee.

The distance between the grinders may be varied from a first distance to at least a second distance during grinding of a dose, wherein said first distance is smaller than said second distance so as to obtain at least a first portion of a dose of ground coffee having a first particle size and a second portion of a dose of ground coffee having a second particle size.

BRIEF DESCRIPTION OF THE DRAWINGS

There now follows a detailed description of the invention, provided by way of a non-limiting example, to be read with reference to the attached drawings, in which:

FIG. 2a shows a schematic illustration of a dose of ground coffee obtained with a standard particle size profile, in a filter basket inserted inside a portafilter;

FIG. 2b shows a schematic representation of a dose of ground coffee obtained with a particle size profile modified according to the present invention, in a filter basket inserted inside a portafilter;

FIG. 3 shows a graph of two particle size profiles on a linear scale, obtained at two different grinding speeds;

DETAILED DESCRIPTION

Figure 1:
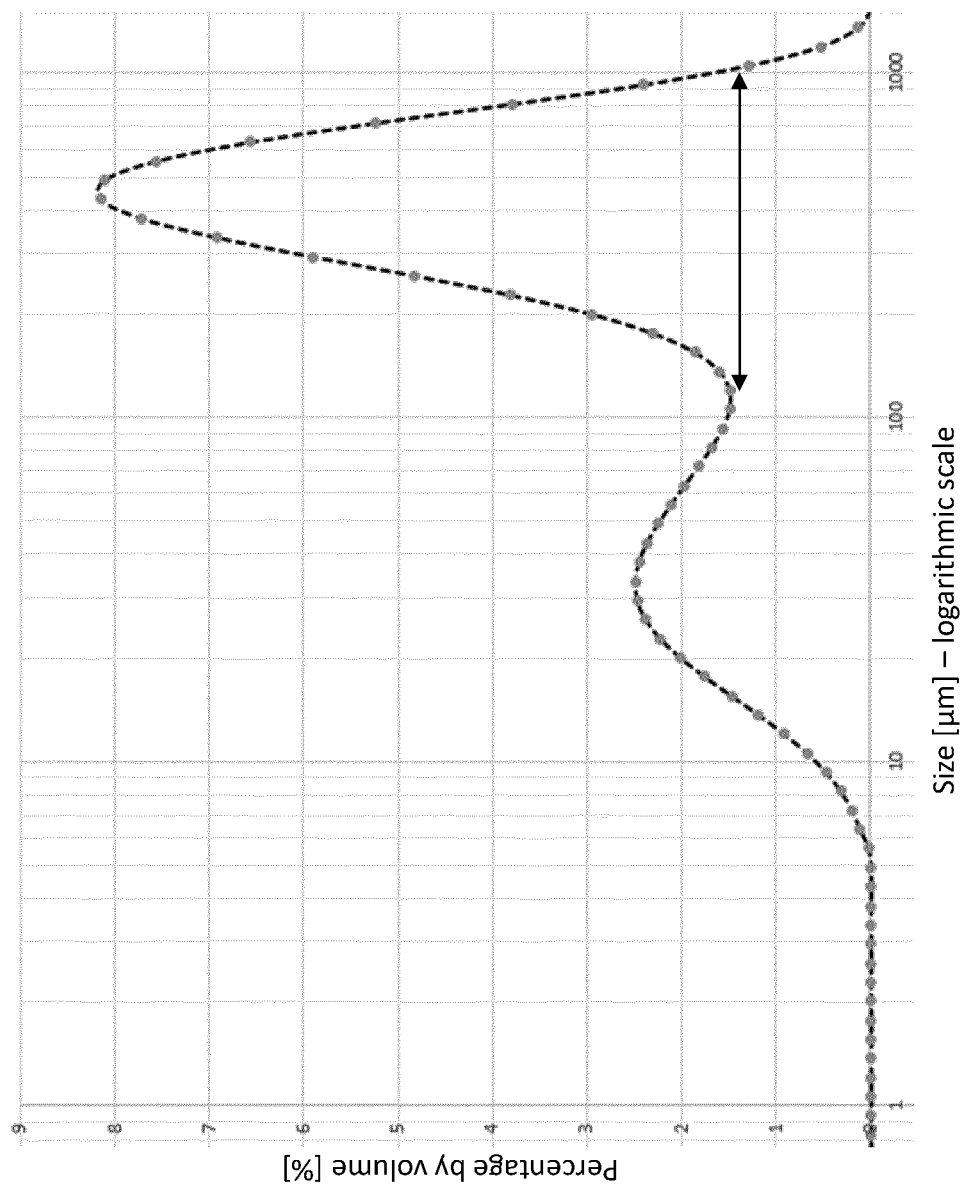
FIG. 1 is graph showing an example of a particle size profile expressed on a logarithmic scale.

FIG. 1, which has already been briefly commented on above, is a graph showing an example of a granulometric profile of a dose of coffee powder. The curve which represents the particle size profile is called a bimodal profile. The high peak (on the right, relating to the larger size particles) is called "first modal" while the low peak (on the left, relating to smaller size particles) is called "second modal".

The Applicant has conducted research and has surprisingly found that a coffee grinding machine able to modify the particle size curve so as to increase the amplitude of the bell corresponding to the first modal (the higher peak on the right in FIG. 1) reduces the sensitivity of the coffee grinding machine. In other words, increasing the amplitude of the first modal reduces the need to have to adjust the particle size when there is variation in the coffee inside the hopper.

The Applicant has conducted further research and has surprisingly discovered that arranging the ground product inside the filter basket in a suitable manner may further reduce this sensitivity. In particular, it has been shown that a better behaviour is obtained by arranging the larger particles at the bottom and the finer particles at the top.

The Applicant has realized that a coffee grinding machine able to vary the particle size curve during grinding of a dose is able to reduce the sensitivity of the coffee grinder and achieve both objects.

According to a first embodiment of the present invention, the coffee grinding machine comprises grinding members, the distance of which is adjustable and varies during the grinding of a dose. Preferably, the distance between the grinding members can be adjusted electrically by means of an actuator (for example an electric motor or a linear actuator, for example a piston 8) and a suitable control circuit.

With a coffee grinding machine according to the first embodiment, it is possible to perform grinding of the dose D by varying (during grinding of the dose) the distance between the grinding members (stepwise or continuously) to obtain a ground product with a first wider mode. In fact it was found that, when the distance between the grinders is reduced, the first modal moves towards the finer particles and, when the distance is increased, the first modal moves towards the larger particles.

Therefore, for example, a coffee grinding machine which produces a first part of the dose of powder with a greater distance between the grinders and the remaining part with a smaller distance between the grinders, overall would generate a ground product with a wider bell of the first modal. Therefore, overall, starting with a certain distance between the grinders and reducing this distance during grinding of a dose, a ground product with a wider bell of the first mode is obtained.

The variation of the distance between the grinders during grinding of a dose F may be continuous or stepwise. With a coffee grinding machine according to the first embodiment, it is also possible to provide, for example, a first layer of ground product using a greater distance to obtain larger particles and a second layer using a smaller distance to obtain finer particles. Obviously, it is possible to obtain more than two layers or also, as mentioned above, a continuous variation by varying the distance between the grinders continuously during the grinding of a dose D (single, double or multiple).

The dose D shown in the figure is obtained by grinding the beans without varying the distance between the grinders. In FIG. 2a the distribution of the ground product inside the filter is random and not controlled.

In FIG. 2b there is a distribution inside the filter suitably controlled using a coffee machine according to the present invention. In particular, the bottom layer is characterized by particles which on average are bigger and the top layer is characterized by particles which on average are smaller. The bottom layer is obtained by keeping the grinders at a greater distance than the distance at which the grinders are situated during the second part of the dose grinding operation, where the top layer with on average finer particles is obtained.

According to another embodiment of the present invention, the coffee grinding machine is configured so as to vary the particle size during the grinding of a dose by means of variation of the relative rotation speed of the grinding members. The expression "relative rotation" is understood as meaning a rotation of one member with respect to another one. Typically one grinding member remains stationary and another grinding member is rotating.

FIG. 3 shows the influence of the rotation speed of the grinders in relation to the size of the particles. In particular, FIG. 3 shows two particle size curves obtained by keeping a constant distance between the grinders and by varying the rotation speed. Differently from FIG. 1, the curves in FIG. 3 are on a linear scale so as to highlight the differences on the first modal.

As can be seen, at the lower speed, the first mode is displaced to the left and its relative amount is reduced to the advantage of the second mode.

At the higher speed, the first mode moves to the right and increases its relative amount.

The variation in speed is preferably obtained by means of a suitable electronic speed regulator for electric motors. Many devices of this type, which vary depending on the type of motor used, are commercially available. According to an embodiment of the present invention, the coffee grinding machine comprises a three-phase asynchronous motor and, for the speed control, an inverter or any known frequency variator.

According to an embodiment of the present invention, the coffee grinding machine performs grinding of the dose at a variable speed (stepwise and/or continuously) to obtain a dose of ground product with a first modal which is wider than normal.

In fact, as regards the above comments, when the rotation speed is reduced, the first mode moves to the left, and, when the rotation speed is increased, the first mode moves to the right. Therefore, for example, a coffee grinding machine according to the invention may be configured so as to provide a part of the powder dose at high speed and the other part at low speed. The dose thus obtained overall would comprise a ground product where the bell of the first modal is wider.

Figure 4:
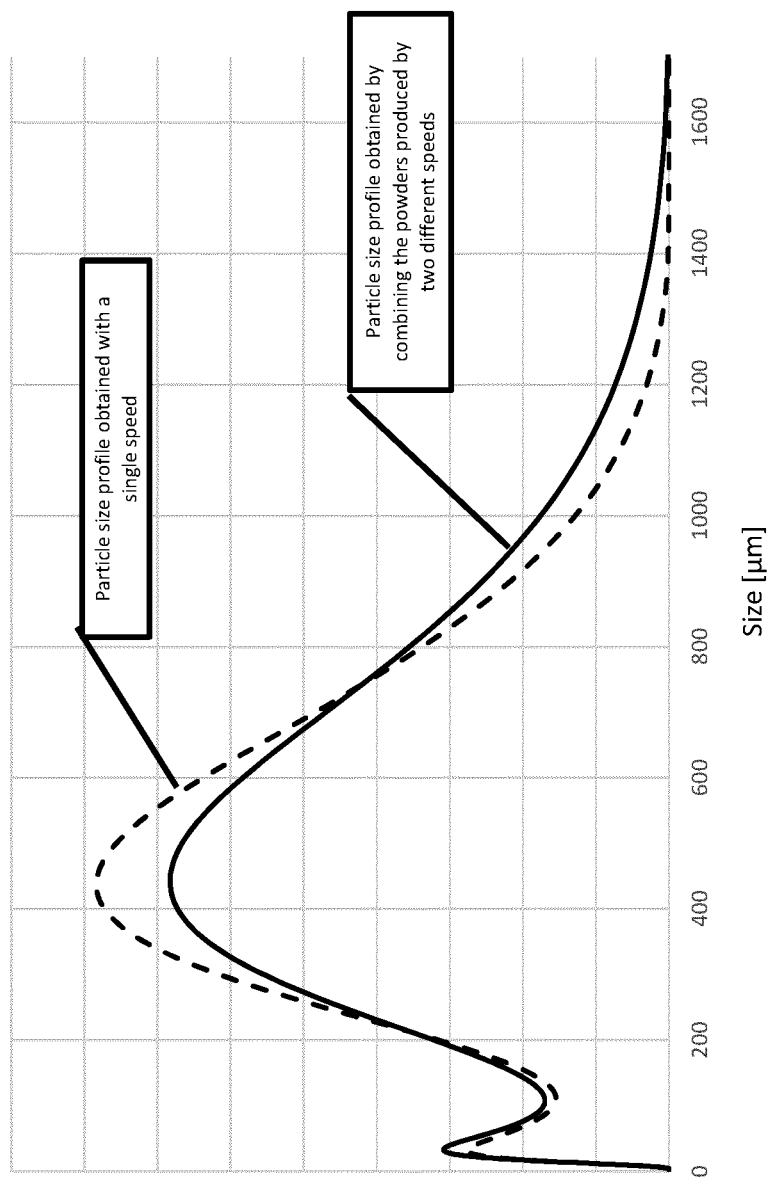
FIG. 4 is a graph of two particle size profiles on a linear scale, the first being obtained at a constant speed and the second being obtained by combining the ground product produced by two different speeds.

FIG. 4 is a graph showing a comparison of two particle size curves. In particular, the figure shows a first particle size curve obtained at a single speed (broken line) and a second particle size curve obtained at two speeds. The particle size curve which is obtained by combining the powders obtained from the two grinding operations performed at different speeds shows a greater dispersion (greater standard deviation) than the curve which produces the same overall head loss, obtained, however, by performing grinding at a constant speed.

According to the present invention, advantageously, it is possible to create, for example, a first layer (bottom layer) of ground product at a higher speed so as to obtain larger particles and a second layer (top layer) at a slower speed to obtain finer particles. Particles belonging to the continuous line curve shown in FIG. 3 would be deposited in the first layer, while particles belonging to the broken line curve are deposited in the second layer. Obviously, it is possible to obtain more than two layers or also a continuous variation by varying the speed continuously.

According to the Applicant, the increase in the amplitude of the bell corresponding to the first mode modifies the organoleptic aspect of the beverage. As is known, in fact, the particle size profile is responsible for the amount of beverage dispensed, for the same dispensing time and therefore flowrate. In fact, the coffee powder results in a "head loss" or "pressure drop" which determines the flowrate of the beverage.

According to the invention it is instead possible to exceed the limits of the known coffee grinding machines and generate more particle size curves with the same head loss. For example, the two curves shown in FIG. 4 are characterized by two different amplitudes of the bell for the first modal.

This means that, although the two curves shown in FIG. 4, result in the same infusion time, the different size of the particles results in a different contact area between water and coffee powder and therefore a different solubility.

The choice of stratification of the particles alters the overall load loss. Arranging the two curves shown in FIG. 3 in the reverse order results in two different head losses and therefore two different beverages. The wetting mode of the coffee powder inside the filter also results in different drainage during the extraction cycle.

Figure 5:
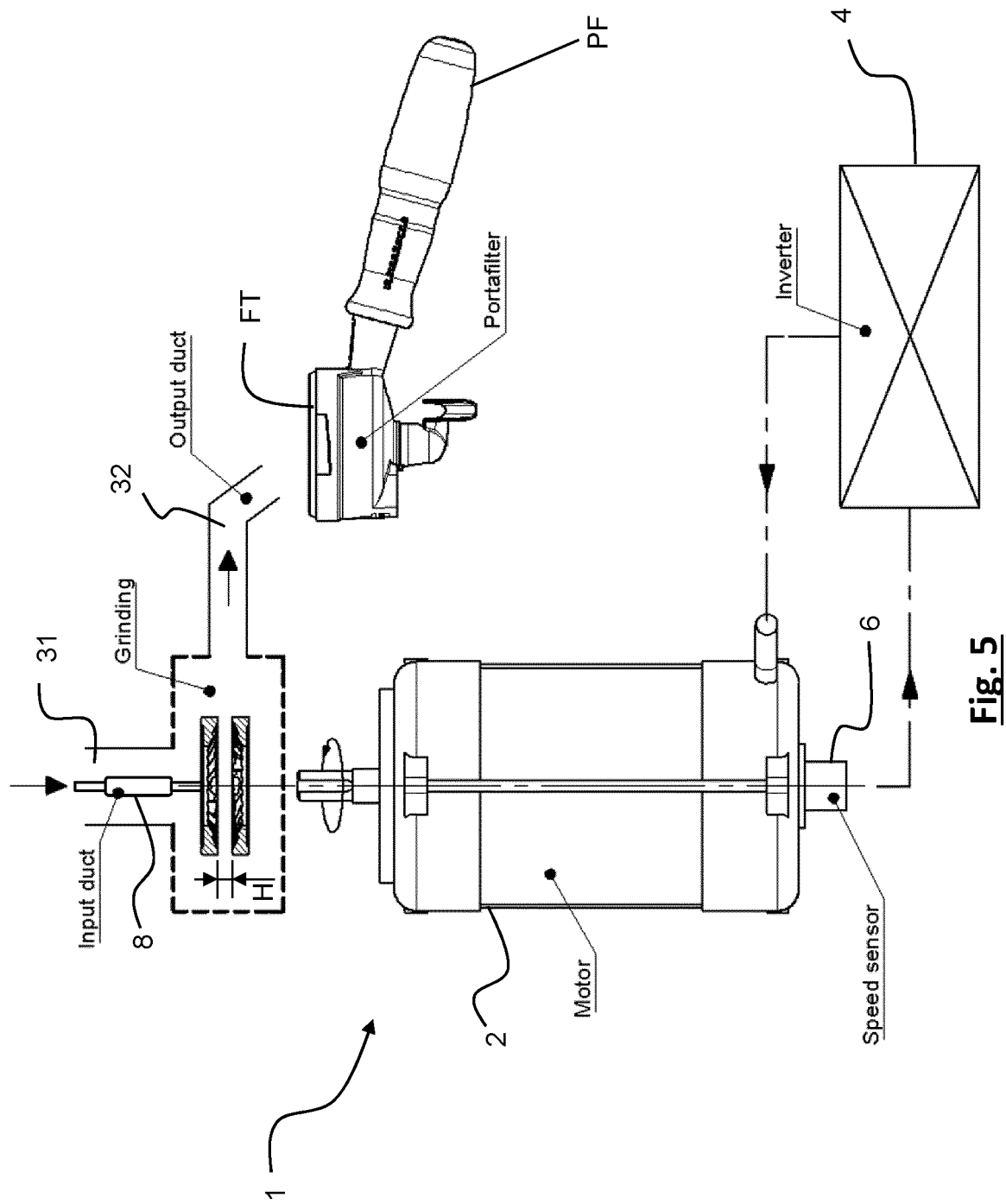
FIG. 5 is a schematic illustration of a coffee grinding machine according to embodiments of the present invention.

FIG. 5 shows in very schematic form the main components of a coffee grinding machine 1 according to embodiments of the present invention: 2 denotes the electric motor for the relative rotation of the grinders 3 or for displacing the grinders 3; 4 denotes the inverter for controlling the speed of the motor; 5 denotes a control unit and 6 denotes an encoder (optional) for detecting the speed.

FIG. 5 also shows in schematic form the path followed by the coffee to be ground as far as the filter basket FT housed inside a portafilter PF.

Figure 6:
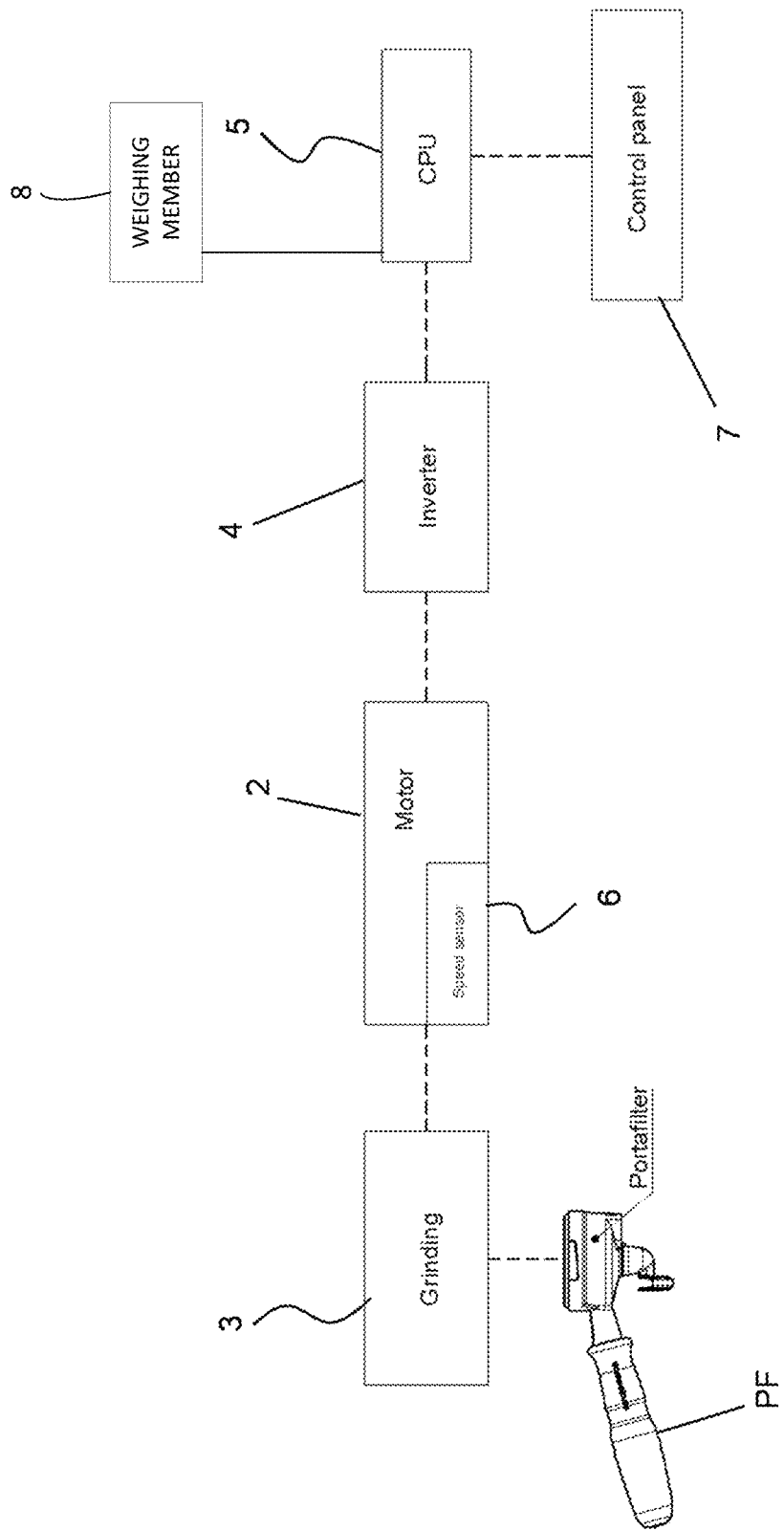
FIG. 6 is an illustration of some components of the machine according to FIG. 5.

According to embodiments, the variation of the speed/distance of the grinders may be performed by the bartender via a suitable interface 7 (FIG. 6). The interface 7 may comprise for example a pushbutton (or a plurality of pushbuttons) for selecting a predetermined rotation speed, a predetermined distance between the grinders, a rotation speed profile and a distance profile between the grinders. The interface may instead comprise a rotatable knob for selecting (continuously or stepwise) a plurality of rotation speeds (or distances between the grinders) or a touch screen for choosing from among various options/speeds which are available. The interface 7 is connected to the inverter 4 (directly or via other devices, for example the CPU 5) for modifying the power supply frequency of the motor and therefore the speed of the latter. Advantageously, it is possible to provide the option of selecting a rotation speed from among those offered by the manufacturer or a speed chosen by the user. Advantageously, it is possible to provide a memory for storing rotation speed values and/or speed profiles for grinding a dose (single, double or multiple) not at a constant speed but at two (or more) different speeds or at speeds which continuously vary.

As previously stated, the coffee grinding machine further comprises a weighing member for calculating the mass of the dose of ground coffee. FIG. 6 shows weighing member 8. The speed variation device 4 is configured to vary the speed from the first speed to the second speed depending on a mass of a first portion of a coffee dose which was ground at said first speed.

The control unit 5 therefore imparts to the inverter 4 the rotation speed for the motor 2. The system may operate both in an open loop, i.e. without measuring the actual rotation speed of the motor, or in a closed loop, i.e. by detecting the speed of the motor using a dedicated device, for example the encoder 6.

The invention claimed is:

1. A coffee grinding machine for grinding coffee beans and forming a dose of ground coffee in a filter basket with a bottom layer of ground coffee having a first mean particle size and an adjacent layer of ground coffee having a second mean particle size, comprising:
   grinding members for grinding coffee beans,
   an electric motor for causing rotation of at least one grinding member with respect to another grinding member,
   a weighing member for calculating mass of the dose of ground coffee, and
   a processor, comprising processor circuitry, configured to execute instructions to cause, during uninterrupted grinding of coffee beans for forming dose, a variation of rotation speed of said electric motor between a first speed and a second speed depending on a mass of a first portion of a coffee dose which was ground at said first speed,
   wherein either
      said second mean particle size is smaller than said first mean particle size and said first speed is greater than said second speed or
      said second mean particle size is greater than said first mean particle size and said first speed is lower than said second speed.

2. The coffee grinding machine according to claim 1, further comprising a revolution counter for counting the number of revolutions of the grinding member with respect to the other grinding member, wherein
   said processor varies the speed from the first speed to the second speed depending on a set number of relative revolutions of said grinding member and said other grinding member.

3. The coffee grinding machine according to claim 1, further comprising a timer, wherein
   said processor varies the speed from the first speed to the second speed depending on a set time period calculated from start-up of the electric motor.

4. The coffee grinding machine according to claim 1, further comprising an interface for selecting a speed profile for grinding a dose of coffee.

5. The coffee grinding machine according to claim 1, further comprising an encoder for detecting the rotation speed of the electric motor.

6. The coffee grinding machine according to claim 1, wherein the electric motor comprises a three-phase asynchronous motor and the configured to cause a variation of rotation speed of the electric motor comprises an inverter.

7. The coffee grinding machine according to claim 1, further comprising a frequency variator configured to cause a variation of rotation speed of the electric motor.

8. The coffee grinding machine according to claim 1, wherein the processor causes the variation of rotation speed of said electric motor during a single and continuous cycle of grinding of the coffee beans for forming the dose.

9. A method of operating a coffee grinding machine to obtain a dose of ground coffee, the method comprising:
   arranging in a filter basket a bottom layer of ground coffee having a first mean particle size and an adjacent layer of ground coffee having a second mean particle size, the first mean particle size being greater than the second mean particle size;
   determining mass of the dose of ground coffee;
   providing an interface for selection of a rotation speed profile;
   using processor circuitry to execute instructions stored on a non-transitory storage medium to control a first grinder member of the machine and a second grinder member of the machine whereby, in accordance with the selection, the first grinder member and the second grinder member are rotated at a first speed and then at a second speed depending on a mass of a first portion of a coffee dose which was ground at said first speed and according to the rotation speed profile during an uninterrupted cycle of grinding to obtain a dose of ground coffee in the filter basket.

10. The method according to claim 9, further comprising counting a number of revolutions of the first grinding member with respect to the second grinding member and varying the speed from the first speed to the second speed depending on a set number of relative revolutions of said first grinding member and said second grinding member.

11. The method according to claim 9, further comprising varying the speed from the first speed to the second speed depending on a set time period calculated from start-up of an electric motor.

12. The method according to claim 9, further comprising varying the speed from the first speed to the second speed depending on a mass of a first portion of a coffee dose which was ground at said first speed.

13. The method according to claim 9, further comprising rotating the first grinding member with respect to the second grinding member at the first speed and then at the second speed during a single and continuous cycle of the grinding for forming the dose.

14. The method of claim 9, further comprising:
   providing the interface for selection of a distance profile;
   using the processor circuitry to execute the instructions to control the first grinder member of the machine and the second grinder member of the machine whereby, in accordance with the selection of the distance profile, the first grinder member and the second grinder member are variably displaced from one another according to the distance profile during the uninterrupted cycle of the grinding to obtain the dose of ground coffee in the filter basket.

15. The method of claim 14, wherein further comprising continually and/or stepwise adjusting a distance between the first grinding member and the second grinding member according to the distance profile.

* * * * *